Sept. 26, 1961     W. C. GREAYER     3,001,393
LINEAR ACCELERATION TEST FACILITY
Filed July 30, 1956     2 Sheets-Sheet 1
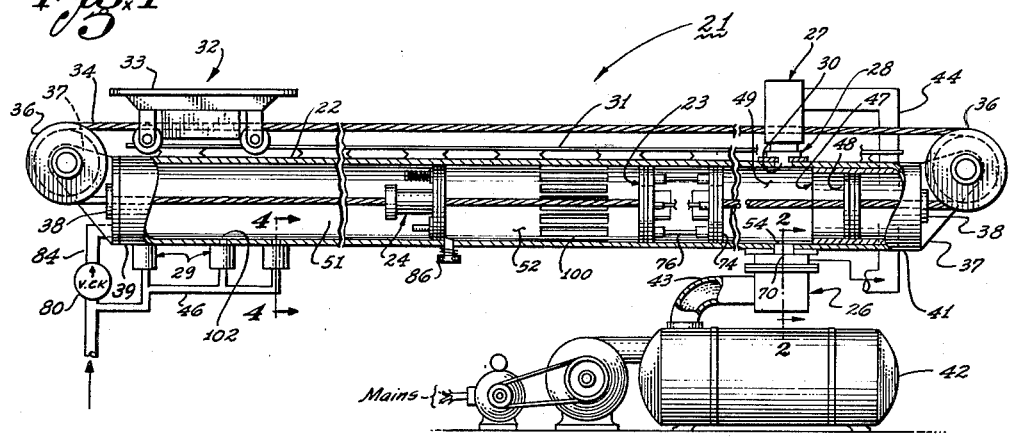
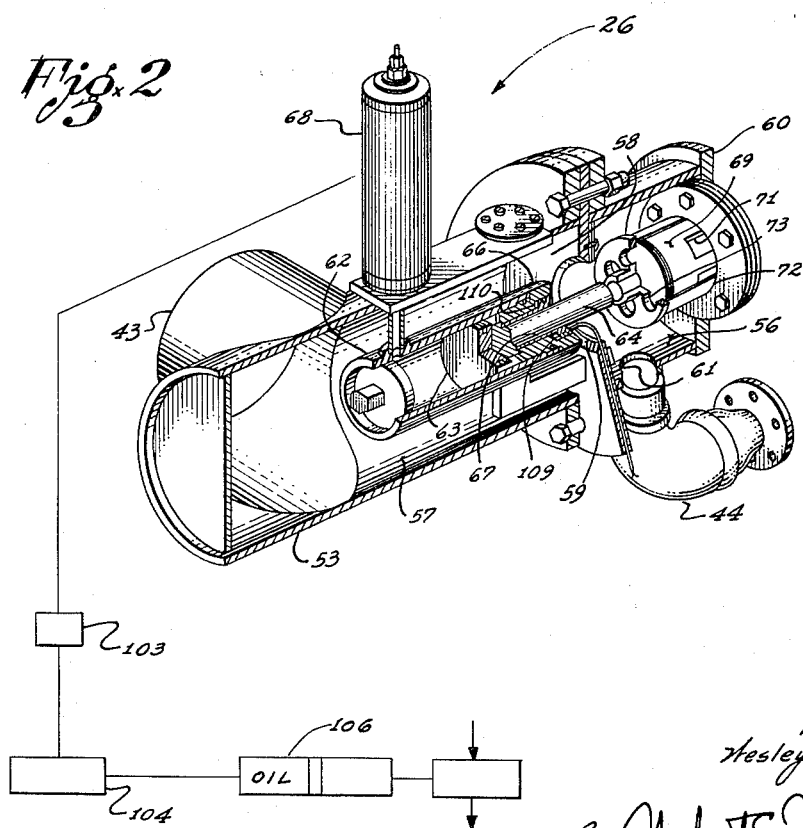
INVENTOR:
Wesley C. Greayer
By Herbert E. Metcalf
His Patent Attorney Sept. 26, 1961 W. C. GREAYER 3,001,393
LINEAR ACCELERATION TEST FACILITY
Filed July 30, 1956 2 Sheets-Sheet 2
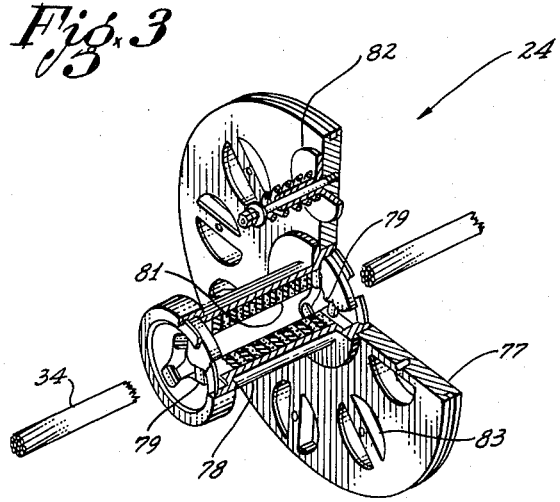
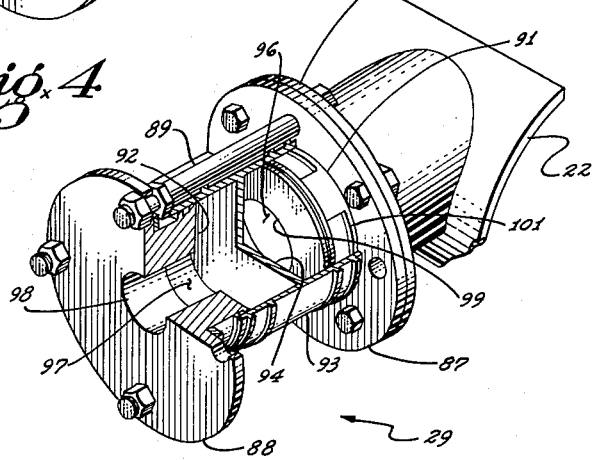
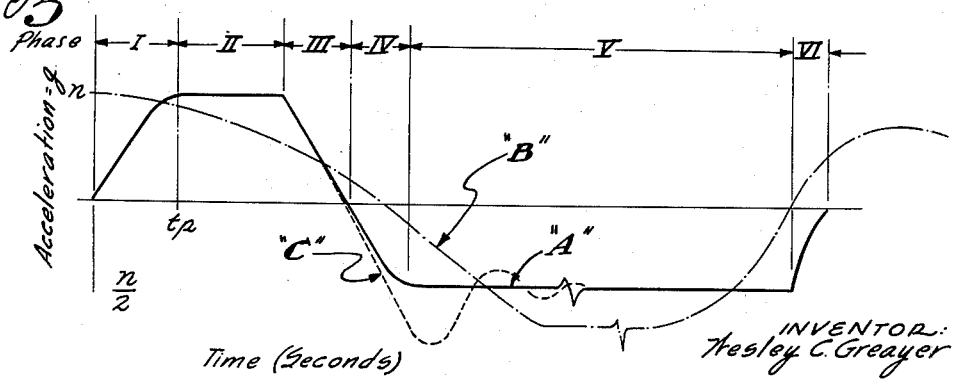
INVENTOR:
Wesley C. Greayer
By Herbert E. Metcalf
His Patent Attorney

3,001,393
LINEAR ACCELERATION TEST FACILITY
Wesley C. Greayer, Torrance, Calif., assignor to Northrop Corporation, a corporation of California
Filed July 30, 1956, Ser. No. 600,931
3 Claims. (Cl. 73—12)

This invention relates to a test facility apparatus and more particularly to a novel test facility adapted to subject a test specimen or the like to periods of controlled acceleration and deceleration.

The test facility as disclosed herein is primarily intended to simulate accelerations encountered during the launching phase of an "air-breathing" missile by means of "JATO" type rockets; however, it is to be understood that it may be utilized for other and similar purposes. Maximum accelerations encountered during the flight of a missile of the above type normally occur during the launching phase thereof. It is, therefore, during this initial acceleration phase that shock-sensitive apparatus carried by the missile, e.g. guidance system apparatus, etc. is damaged and malfunctions if at all. Although greater accelerations may be encountered during the terminal dive phase of the missile's flight these latter accelerations are not important insofar as a successful flight is concerned.

In view of the foregoing discussion it will be apparent that, in testing shock-sensitive apparatus in an acceleration facility, the subject apparatus must not be subjected to equal or greater negative accelerations than positive accelerations. Otherwise the acceleration phase during which damage occurred to the shock-sensitive apparatus or test specimen can not be positively determined. Therefore, a test facility to have maximum efficiency and utility must not only simulate a missile's initial acceleration but must also incorporate means for controlling decelerations of the test specimen or shock-sensitive equipment in order that the specimen or equipment will not be damaged during the latter acceleration phases.

Accordingly it is an object of the present invention to provide a test facility adapted to simulate the launching accelerations encountered by an "air-breathing" missile during the launching thereof by "JATO" rockets.

Another object is to provide a test facility adapted to subject a test specimen or shock-sensitive equipment to a controlled acceleration build-up with respect to time.

Another object is to provide a test facility adapted to subject a test specimen or shock-sensitive equipment to a sustained acceleration at the peak value attained during the acceleration build-up thereof.

Another object is to provide a test facility adapted to subject a test specimen or shock-sensitive equipment to an acceleration decay and deceleration build-up at a lower rate of change of acceleration than experienced during the acceleration build-up thereof.

Another object is to provide a test facility adapted to subject a test specimen or shock-sensitive equipment to a constant deceleration at any desired value.

Another object is to provide a test facility for subjecting a test specimen or shock-sensitive equipment to acceleration shocks which is simple in design and construction and, therefore, precludes the possibility of malfunctioning and which may be readily and flexibly adapted to the various purposes intended.

The above and other objects and advantages of this invention will become more apparent from the following description and drawings in which the reference characters denote like parts throughout the several views. It is to be expressly understood, however, that the drawings are for the purpose of illustration only and not a definition of the limits of the invention, reference being had for this purpose to the appended claims.

In the drawings:

FIGURE 1 is a combined schematic elevational and sectional view of the test facility as disclosed herein.

FIGURE 2 is a perspective sectional view of the programming valve of the test facility of FIGURE 1 taken along the line 2—2 thereof.

FIGURES 3 and 4 are respective perspective views of the braking piston and braking pressure regulator of the test facility of FIGURE 1, parts of these components having been removed for purposes of clarity.

FIGURE 5 is a graphic representation of the accelerations and decelerations achieved by the test facility of FIGURE 1 as compared with those achieved by currently known test facilities.

Referring now to the drawings, FIGURE 1 shows a test facility of the type disclosed herein indicated generally by the numeral 21. Components of the test facility include an elongated cylindrical housing or tube 22 which houses a driving and a braking piston 23 and 24, respectively, operationally mounted therein. The facility 21 also includes a programming valve 26, quick opening valve 27, initial orifice assembly 28, and braking pressure regulators 29.

The tube 22 is normally mounted in a horizontal or if desired an inclined attitude by structure (not shown). Mounted on the upper portion of the tube 22 and extending lengthwise thereof is a track 31 on which a wheeled sled assembly 32 is operationally mounted. The sled assembly 32 is of suitable construction rendering it sufficiently rigid to withstand acceleration shocks yet having the quality of lightness permitting it to be accelerated and decelerated quickly under the conditions of use. Shock-sensitive missile components to be tested are fixedly secured on the platform portion 33 of the sled assembly 32.

The sled assembly 32 is fixedly secured to a vinyl-covered cable 34 which passes over pulleys 36, mounted on suitable supporting structure 37—37, which are located at each end of the tube 22. The cable 34 passes through seal assemblies 38 located respectively at the extreme forward and aft ends 39 and 41 of the tube 22. The cable terminates at the driving piston 23 and its ends are attached thereto. That portion of the cable 34 entering the forward end of the tube 22 passes through the braking piston 24 in a near fluid-tight relation in a manner to be explained presently.

In the embodiment shown compressed air at approximately 500 p.s.i. is utilized to operate the facility 21 and the air is stored in a high pressure container 42. This air, hereinafter referred to as system fluid at pressure $P_S$, communicates with the programming valve 26 through a conduit 43. Initially the system fluid bypasses the valve 26, in a manner to be explained presently, and communicates with the bore defined by the aft end portion of the tube 22 through a conduit 44 at such time as the quick opening valve 27 is open. Fluid forced from the forward end 39 of the tube 22 passes through the regulators 29 after which it is exhausted to the atmosphere.

Operation of the facility 21 is effectively controlled by gauges, valves, and switches mounted on control panels (not shown) which are located in a suitable control room. Data in connection with each operational run of the facility 21 is gathered and recorded by suitable recording apparatus (not shown) also located in the control room.

Mounted in the extreme aft end 41 of the tube 22 is a volume adjust mechanism 47 including a piston 48. The volume adjust mechanism 47 may be of any conventional construction or may take the form of the volume adjust mechanism as disclosed in United States Patent No. 2,604,777. The piston 48 may be longitudinally adjusted with respect to the tube 22, accordingly the mechanism 47 provides means for varying the volume of the chamber 49 located between the piston 48 and the aft end of the driving piston 23. The volume of the chamber 49 and the initial flow rate of fluid into this chamber determine the maximum acceleration and the rate of acceleration build-up of the driving piston 23 and accordingly of the sled 32 in a well known manner. It will also be noted that the driving and braking pistons 23 and 24, respectively, as located in their initial positions as shown in FIGURE 1, also define chambers 51 and 52. The chambers 51, 49, and 52 will hereinafter be referred to as forward, aft, and intermediate chambers, respectively.

Referring now to FIGURE 2 it will be seen that the programming valve 26 includes a cylindrical housing 53 closed at its outer end and partially closed and flanged at its inner end by a disc-like member 60, the latter providing means whereby the valve may be secured in fluid-tight relation to provide fluid communication with the chamber 49 through an aperture 54 formed in the tube 22. The aperture 54 is located just forward of the mechanism 47 and, therefore, provides fluid communication between the valve 26 and the aft chamber 49. Fluid enters the valve housing 53 at the outer end thereof through the aforementioned conduit 43. Internally the housing 53 is divided into inner and outer compartments 56 and 57, respectively, by means of an annular partition wall 58 having a central aperture 59. Also provided in the cylindrical wall of the housing 53 is an aperture 61 which provides fluid communication between the inner compartment 56 and the aforemention conduit 44.

A secondary cylindrical housing or cylinder 62 is concentrically mounted within the housing 53 in the outer compartment 57. The outer end of the housing 62 is closed and its forward end is spaced from the partition 58. Operationally mounted in the housing 62 is a piston 63 and piston rod 64, the latter extending through the aperture 59 for a purpose to be explained presently. Surrounding the piston rod 64 is a gland 66 and auxiliary annular piston 67. The gland is fixedly secured to the housing 62 while the auxiliary piston 67 moves slightly in a longitudinal direction with respect to the rod 64 for a purpose to be explained later. Hydraulic fluid contained in a reservoir 68 communicates at all times with the interior of the housing 62 aft of the piston 63.

A cylindrical cup-shaped member 69 is secured to the inner end of the housing 53 in concentric relation with respect to the housings 53 and 62. A plurality of circumferentially spaced ports 71 are provided in the member 69 at the extreme inner end thereof. Surrounding the member 69 in fluid-tight telescopic relation is a cup-like valve member 72. The outer partially closed end of the member 72 is secured to and moves with the piston rod 64. A plurality of apertures 73 are provided in the outer end of the member 72 which function to permit fluid to enter the space between the head end of the members 69 and 72.

For the initial operating phase of the valve 26 hydraulic fluid at approximately 400 p.s.i. is present in the reservoir 68 and outer end of the housing 62. This pressurized fluid forces the piston 63 to the extreme right of its travel as viewed in FIGURE 2. This movement bottoms the cup member 72 on the disc-like member 60 thereby precluding fluid flow through the ports 71 and aperture 54. The member 60 has a central aperture 70 which is aligned with the aperture 54 when the valve 26 is mounted in its operating position on the tube 22. At this time pressurized fluid (air at approximately 500 p.s.i.) enters the forward compartment 57 from the container 42 via the conduit 43. The latter pressurized fluid then flows to the quick opening valve 27 via the housing 53, aperture 59, and conduit 44. Later operational phases of the valve 26 will be described during the description of operation of the facility 21.

The quick opening valve 27 constitues trigger means which start the acceleration cycle of the facility 21. This valve 27 may be of the type disclosed in copending application, Serial Number 525,664, filed August 1, 1955 and now abandoned and may be triggered by any conventional means (not shown). A valve of this character will open quickly to allow a sufficient volume of fluid to pass therethrough and thus provide a build-up that will conform to a predetermined theoretical curve.

The orifice assembly 28 includes an orifice 30 through which all fluid initially flows in entering the aft chamber 49 of the tube 22. This orifice 30 is normally adjustable to allow greater or less quantites of fluid flow therethrough as conditions dictate. A constant flow rate of fluid is required through the orifice 30 to produce a sinusoidal build-up of acceleration vs. time. A constant flow rate through the orifice is achieved by maintaining a fluid pressure ratio of at least 0.53 or a critical pressure across the orifice 30 as is well known in the art. Accordingly with a constant up-stream pressure, the initial orifice setting determines the initial flow rate into the aft chamber 49.

The driving piston 23 consists of fore and aft identical auxiliary pistons 74 held in spaced relation by a plurality of rods 76. The cable 34 terminates at the piston 23 and the ends thereof are secured respectively, as by swaging or the like, to the fore and aft individual auxiliary pistons 74.

The braking piston 24 includes a piston 77 and a seal and guide housing 78 concentrically arranged and extending normal to a circular face of the piston 77 as best seen in FIGURE 3. The cable 34 passes in sliding relation through the piston 77 and housing 78 and is directed therethrough by fore and aft cable guide assemblies 79—79. Located between the guide assemblies 79—79 is a seal assembly 81 which consists of alternate rings of felt and leather which slidingly hug the vinyl-covered cable 34. These felt and leather rings constituting the assembly 81 are impregnated with oil and when subjected to fluid pressure embrace the cable 34 to provide a near fluid-tight seal. Prerated check valves 82 are provided to normally close a plurality of symmetrically arranged apertures 83 provided in the piston 77 for a purpose which will appear presently.

With the braking piston 24 in its operational position, as shown in FIGURE 1 and prior to an operational run of the facility 21, braking fluid (compressed air at approximately 100 p.s.i.) is allowed to enter the forward compartment 51 through a conduit 84 from a fluid source (not shown). A check valve 80 is provided in the conduit 84 allowing fluid flow therethrough to the chamber 51 but precludes flow in the reverse direction. The braking piston 24 is restrained from further movement to the right of its position as shown in FIGURE 1, due to the aforementioned pressurized fluid in chamber 51 acting thereon, by means of a piston stop mechanism 86. The mechanism 86 constitutes a spring urged pin having a tapered end. It (mechanism 86) may be either manually or automatically actuated and although it effectively restricts movement of the piston 24 to the right (FIGURE 1) it will not restrict movement of the driving piston 23 to the left at any time during the travel of the latter.

The seals 38 are constructed similarly to the seal assembly 81 as previously described, therefore, they also provide effective seals with the cable 34 at the fore and aft ends of the tube 22.

The pressure regulators 29 are of identical construction and each consists of inner and outer disc-like members 87 and 88, respectively, spaced from each other by rods 89 extending between peripheral portions of the disc-like members as shown in FIGURE 4. Both of the members 87 and 88 have projecting cylindrical portions 91 and 92, respectively, opposing each other and around which a cylindrical sleeve 93 is positioned in sliding but fluid-tight relation. The sleeve 93 is provided with a solid transverse partition 94 located at substantially the midpoint thereof. This partition 94 divides the chamber, provided between the projecting portions 91 and 92, into inner and outer compartments 96 and 97, respectively. Pressurized fluid (air at approximately 100 p.s.i.) is allowed to enter conduit 46 from a fluid source (not shown) and continuously communicates with the outer compartment 97 through the conduit 46 and an aperture 98 formed in the member 88. The inner projecting portion 91 constitutes a cylindrical shell closed at its outer end except for an aperture 99 provided therein. Provided in the cylindrical wall of the portion 91 is a plurality of ports 101 which are closed at such times as the sleeve is bottomed on the member 87 and are opened to the atmosphere in varying degrees at such times as the sleeve 93 is moved outwardly from its aforementioned bottomed position. The pressure regulators 29 are secured to the tube 22 as shown in FIGURE 1 so that the interior of the portion 91 and the inner compartment 96 are in fluid communication with the forward chamber 51 of the tube 22 through apertures 102.

With the pressure regulators 29 assembled and attached to the tube 22 as described above it will be apparent that, prior to an operational run of the facility 21, the inner and outer compartments 96 and 97 of the regulators 29 are each subject to fluid at 100 p.s.i. Thus it will be seen that as pressure build-up occurs in the forward chamber 51, due to the braking piston being forced to the left, the sleeve 93 will be urged outwardly at such time as the fluid pressure in the chamber 51 exceeds the pressure of fluid in compartment 97 of the regulator 29. At such time as the sleeve 93 moves outward with respect to the tube 22, fluid from the chamber 51 will escape to ambient atmosphere through the ports 101. Thus it will be seen that through the latter phase of an operational run of the facility 21 the fluid pressure in the forward chamber 51 is maintained substantially constant. This feature is utilized to regulate the deceleration phase of the facility 21 in a manner presently explained.

Referring now to FIGURE 5 various curves are shown in which accelerations (g) are plotted against time (seconds). The curve, identified by the letter "A" (solid line), represents desired controlled accelerations and decelerations as achieved by the facility 21. The curve, identified by the letter "B" (dot-and-dash line), displays undesirable accelerations and decelerations achieved by devices which are similar in construction to the facility 21 and which are now well known in the art.

In FIGURE 5 curve "A" (solid line) is characterized by the following acceleration and deceleration phases:

Phase I: This phase represents the acceleration build-up period of the facility 21. This acceleration is at a controlled sinusoidal variable and simulates actual accelerations encountered during the acceleration build-up of a missile launcher by "JATO" rockets.

Phase II: This phase represents the constant acceleration period of the facility 21, during this phase acceleration at the Phase I peak value is sustained throughout a predetermined elapsed time.

Phase III: This phase represents the acceleration decay period of the facility 21, during this phase acceleration is controlled to provide a lower rate of change of acceleration than during Phase I.

Phase IV: This phase represents the deceleration build-up period of the facility 21, during this period deceleration is also controlled to provide a lower rate of change of acceleration than during Phase I.

Phase V: This phase represents the deceleration after build-up period of the facility 21, during this period deceleration is substained at a "g" value equivalent to approximately one-half the acceleration of Phase II.

Phase VI: This phase represents the deceleration decay period of the facility 21, deceleration is uncontrolled during this period.

The various components of the test facility 21 cooperate during an operational run thereof to subject shock-sensitive equipment, secured to the platform 33 of the sled assembly 32, to acceleration and deceleration periods as represented by the curve "A" of FIGURE 5 and as described above. The operation of the facility 21 and the manner in which the components thereof cooperate to provide the above result follows:

Prior to an operational run of the facility 21 all components thereof are checked to ascertain that they are functioning properly. Fluid pressures in the container 42 and those entering the tube 22 through the conduit 84 are checked. As previously mentioned, in the embodiment shown and for purposes of illustration, it is assumed the facility 21 is operated by compressed air. Air in the tank 42 being at a pressure $P_S$ of approximately 500 p.s.i. while air at a pressure $P_F$ of aproximately 100 p.s.i. enters through the conduit 84.

As shown in FIGURE 1 the driving and braking pistons 23 and 24 are in their respective initial positions within the tube 22, i.e. the position they are caused to assume before pressurized air enters the aft chamber 49 but at such time as pressurized air is present in the forward chamber 51. Positioning the driving piston 23 in its initial position automatically positions the sled assembly 32 in its initial position adjacent the forward end 39 of the tube 22.

Also prior to an operational run of the facility 21 the orifice 30 of the orifice assembly 28, i.e. if the orifice 30 is adjustable, and the volume adjust mechanism 47 are adjusted in accordance with previously calculated data to provide maximum acceleration and the rate of acceleration build-up desired during the previously described Phase I.

The above adjustments having been made, the quick opening valve 27 is now triggered allowing air at pressure $P_S$ to flow into the aft chamber 49. During the Phase I operation of the facility 21 the pressure $P_S$ is sufficient to maintain the aforementioned critical pressure across the orifice 30 of the assembly 28. Accordingly a maximum and constant flow rate will occur through the orifice 30. This maximum and constant flow rate inherently will accelerate the driving piston 23 in accordance with the sinusoidal portion of curve "A" (Phase I).

Accelerations experienced during the sinusoidal portion of curve "A" (Phase I) simulates the acceleration of a missile or the like launched by the means of "JATO" rockets. The acceleration build-up of a "JATO" rocket is also inherently sinusoidal in nature. Therefore any shock-sensitive equipment mounted on the sled assembly 32 will be subject to the same type of acceleration build-up as though the equipment was actually mounted on a missile launched by "JATO" rockets.

At a predetermined position of the driving piston 23, i.e., during the latter's Phase I operation, the sled assembly 32 or piston 23 triggers an electric switch (not shown) which actuates a solenoid 103 (FIGURE 2). The action of the solenoid 103 allows oil to escape from the reservoir 68 past a needle valve 104 and then to an accumulator 106. Thus the hydraulic pressure acting on the outer face of the piston 63 is reduced. At this time air at pressure $P_S$ is acting on the inner end of the auxiliary piston 67 and on the inner end of piston rod 64. The inner face of the auxiliary piston 67 provides initially a greater area against which the pressure $P_S$ acts, however, a shoulder 109 on the auxiliary piston 67 is bottomed on the gland 66 after a short outward travel. This initial greater area (the inner end of the auxiliary piston 67) allows the air at $P_S$ to overcome inertial forces of the piston 63, rod 64, and valve member 72, and thereby provides quick acceleration of the valve member 72. After the auxiliary piston 67 has bottomed in the gland 66 the only force urging the piston 63 and valve member 72 to the left (FIGURE 2) is the air at pressure $P_S$ acting on the inner end of the piston rod 64.

With the initial movement of the valve member 72 to the left (FIGURE 2) the ports 71 are progressively uncovered to expose larger areas. This action initiates the constant acceleration portion of curve "A" (Phase II). Increasing quantities of air at pressure $P_S$ flows through to ports 71 and 54 to maintain the constant acceleration of the driving piston 23 as shown in FIGURE 5 (Phase II).

Shortly after the ports 71 are completely uncovered the head of the valve member 72 bottoms on the partition wall 58 precluding further air flow through the aperture 59 and therefore to the aft chamber 49 of the tube 22. At this time the acceleration decay period of curve "A" (Phase III) is initiated. The driving piston at this time passes the ports 100 and the expanding air escapes through the ports 100 and the acceleration falls off at a lower rate of change than during its sinusoidal build-up (Phase I).

Also, as the piston passes the ports 100 and the pressurized air escapes through these ports to the atmosphere, air in turn is trapped and compressed between the driving and braking pistons 23 and 24, respectively. This action initiates the deceleration build-up period of curve "A" (Phase IV). At this time, i.e. as the forward end of the driving piston 23 passes the forward end of the ports 100, air trapped between the pistons 23 and 24 will not retard the acceleration at a greater rate than the rate of change of acceleration experienced during the sinusoidal portion of curve "A" (Phase I).

The acceleration decay (Phase III) and deceleration build-up (Phase IV) is achieved due to the relative position of the braking piston 24 in the tube 22 with respect to the ports 100. It is important that the rate of change of acceleration is maintained at a lower level during Phases III and IV than during Phase I otherwise if later inspection reveals damage to shock-sensitive equipment mounted on the sled assembly 32 positive determination as to where this damage occurred (whether Phase I, III or IV) is impossible.

As air pressure build-up occurs between the driving and braking pistons 23 and 24, respectively, and reaches a predetermined value the check valves 82 in the braking piston 24 open to allow the passage of air from the intermediate chamber 52 to the forward chamber 51. The opening of the valves 82 eliminates a premature pressure build-up between the driving and braking pistons and effectively precludes an overshoot of the deceleration build-up of the curve "A" (Phase IV). If the valves 82 did not open as explained above the deceleration build-up would overshoot in the manner as indicated by the curve "C" of FIGURE 5.

As the braking piston 24 begins its travel to the left (from its initial position—FIGURE 1) it compresses air at an initial pressure $P_T$ of 100 p.s.i. Therefore the driving piston 23 does not have to travel as far as is normally the case in conventional shock test equipment, i.e. if the braking piston 24 was not present to maintain a body of pressurized air for braking purposes.

At such time as the air pressure in the forward chamber 51 exceeds the air pressure (100 p.s.i.) in the conduit 46 the sleeves 93 of the regulators 29 (FIGURE 4) are urged outward and the ports 101 are uncovered. This regulator action allows air from the forward chamber 51 to escape to the atmosphere. With the regulators 29 controlling the air escaping to the atmosphere the pressure in the intermediate and forward chambers 52 and 51, respectively, remains constant and the deceleration of the driving piston is sustained at a constant "g" value, as indicated by the deceleration after build-up period of the curve "A" (Phase V), which is preset to be equivalent to approximately one-half the acceleration experienced during the Phase II operation.

The deceleration phase of the driving piston 23 is concluded as indicated by the deceleration decay portion of the curve "A" (Phase VI). The Phase VI portion of the curve "A" merely indicates that the deceleration of the driving piston 23 has reached zero and, therefore, the acceleration curve "A" is returned to zero for completeness.

The sled assembly 32 and the driving and braking pistons 23 and 24 may now be returned to their initial positions in an obvious manner and the facility 21 readied for another operational run. In returning the piston 63 (FIGURE 2) to its initial position, shown in FIGURE 2, it will be apparent that the annular shoulder 109 on the auxiliary piston 67 will be spaced from the annular shoulder 110 on the gland 66. As previously explained this construction initially provides a greater surface area for the air at pressure $P_S$ to act against to overcome the inertia of the working parts of the valve 26.

It is to be understood that the various orifice openings, fluid pressures, etc. may be varied to provide various and desired results and need not conform to illustrations as set forth herein which are merely for purposes of illustration and are not intended to be limiting in any respect. If the test specimen or shock-sensitive equipment is fairly small it may be mounted directly on the driving piston 23. In the latter event the sled assembly 32 will not be utilized and may be dispensed with.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. In a test facility the combination comprising: an elongated tube having fore and aft ends; fore and aft closure members mounted in the respective ends of said tube defining a partially closed operating chamber; a driving piston operationally mounted in said tube dividing said chamber into fore and aft chambers, a length of vinyl-covered cable; the end portions of said cable extending through said closure members in a near fluid tight and sliding relation therewith and being secured to respective sides of said driving piston; a pair of pulleys mounted externally of and adjacent the fore and aft ends of said tube, respectively; the intermediate portions of said cable passing over said pulleys and extending parallel to the axis of said tube; track means mounted externally of and extending lengthwise of said tube; a sled assembly mounted on said track means and secured to said intermediate portion of said cable whereby said sled assembly is moved between the ends of said tube at such times as said driving piston is actuated from one end to the other end of said tube; a braking piston mounted in said forward chamber dividing the latter into an intermediate chamber located between said driving and braking pistons and an auxiliary chamber located between said forward closure member and said braking piston; said braking piston including means allowing said cable to pass therethrough in sliding and near fluid tight relation; said braking piston being further characterized by including valve means allowing fluid flow from said intermediate chamber to said auxiliary chamber at such times as the fluid pressure in said intermediate chamber exceeds the fluid pressure in said auxiliary chamber; a source of pressurized fluid; port and valve means whereby fluid may be directed from said fluid source to said auxiliary and aft chambers and exhausted from said auxiliary and intermediate chambers to ambient atmosphere; said port and valve means including valve and conduit means allowing fluid to be stored in said auxiliary chamber at a predetermined pressure and exhausted therefrom at such times as the fluid pressure in said auxiliary chamber exceeds said predetermined pressure.

2. In a test facility as set forth in claim 1: further characterized in that said port and valve means includes quick opening valve means allowing sufficient fluid flow from said fluid source to said aft chamber to impart a sinusoidal acceleration to said driving piston.

3. In a test facility as set forth in claim 2: further characterized in that said port and valve means includes programming valve means allowing additional fluid flow from said fluid source to said aft chamber for a predetermined time after the said quick opening valve has been opened and said driving piston has completed its sinusoidal acceleration.

References Cited in the file of this patent

UNITED STATES PATENTS

| | | |
|---|---|---|
| 1,092,984 | Ewalt | Apr. 14, 1914 |
| 1,756,910 | Fuller | Apr. 29, 1930 |
| 2,094,124 | Huffman | Sept. 28, 1937 |
| 2,311,212 | Coberly | Feb. 16, 1943 |
| 2,537,096 | Shreeve et al. | Jan. 9, 1951 |
| 2,604,777 | Armstrong et al. | July 29, 1952 |
| 2,631,480 | Romine et al. | Mar. 17, 1953 |
| 2,724,966 | Northrop et al. | Nov. 29, 1955 |
| 2,810,288 | Herron et al. | Oct. 22, 1957 |